UNITED STATES PATENT OFFICE.

CHRISTOPHER TATGE, OF PIERCE, NEBRASKA.

WASH FOR TREES, &c.

SPECIFICATION forming part of Letters Patent No. 588,031, dated August 10, 1897.

Application filed April 3, 1897. Serial No. 630,621. (No specimens.)

*To all whom it may concern:*

Be it known that I, CHRISTOPHER TATGE, a citizen of the United States, residing at Pierce, in the county of Pierce and State of Nebraska, have invented certain new and useful Improvements in Compounds for Treating Trees, Plants, and Flowers; and I do hereby declare the following to be a full, clear, and exact description of the invention, such as will enable others skilled in the art to which it appertains to make and use the same.

This invention relates to a new and useful compound for treating trees, plants, and flowers; and it consists in the special compound hereinafter described and claimed.

The invention is designed, primarily, for use in connection with fruit or forest trees, to destroy the insects commonly known as "borers," and to prevent their entering into the tree or fruit, and to act generally as an insecticide.

To this end the invention consists of a liquid compound which is to be used as a wash, the same being applied to the trunk or branches of the tree either by a brush, spray, or in any other desirable manner.

The compound consists of the following ingredients: white-oak-bark extract, dog-fennel, (May-weed extract,) castor-oil, beeswax, and turpentine. These substances are compounded in the following manner: I first boil two bushels, more or less, of white-oak bark in ten gallons of water. I then remove the fiber and add to the liquid one gallon of the extract of dog-fennel, obtaining the latter by boiling a bushel, more or less, of the dog-fennel in one gallon, more or less, of water, afterward removing the fiber. To this composition of white-oak and dog-fennel substance I then add one gallon of castor-oil, two pounds of beeswax, and one quart of turpentine. The mixture is then thoroughly agitated and compounded, resulting in the production of a very valuable wash.

The white-oak-bark substance gives the tree in some respects the nature of the white-oak, which is not usually affected by the insects. The dog-fennel substance is a poison to the insects and destroys all which bore into the tree. The castor-oil and beeswax serve as a salve, and so far excludes the air that borers in the tree will come out. The turpentine by evaporation serves to keep the insects from the fruit and branches.

The wash is to be applied to the trees in the early spring while the sap is running up, so that the wash will in a measure enter the circulation of the tree.

I have found by actual test on many trees that the wash is effectual for the purposes described.

Having thus described the invention, what is claimed, and desired to be secured by Letters Patent, is—

A wash for trees, plants and flowers containing white-oak-bark extract, dog-fennel extract, castor-oil, beeswax, and turpentine, substantially in the proportions specified.

In testimony whereof I affix my signature in presence of two witnesses.

CHRISTOPHER TATGE.

Witnesses:
   THOS. CHILVERS,
   L. R. HERTERT.